United States Patent [19]
Nambu

[11] Patent Number: 5,604,420
[45] Date of Patent: Feb. 18, 1997

[54] STABILIZER FOR POWER SYSTEM

[75] Inventor: Masahiko Nambu, Hyogo, Japan

[73] Assignee: Mitsubishi Denki Kabushiki Kaisha, Tokyo, Japan

[21] Appl. No.: 405,774

[22] Filed: Mar. 17, 1995

[30] Foreign Application Priority Data

Nov. 30, 1994 [JP] Japan ................................. 6-297235

[51] Int. Cl.⁶ .................................................. H02P 9/10
[52] U.S. Cl. .............................. 322/19; 322/20; 322/58; 361/20
[58] Field of Search ............................. 322/20, 29, 58, 322/32; 361/20

[56] References Cited

U.S. PATENT DOCUMENTS

| | | | |
|---|---|---|---|
| 3,855,519 | 12/1974 | Waldmann | 322/20 |
| 3,916,291 | 10/1975 | Raczkowski | 322/19 |
| 4,326,159 | 4/1982 | Aotsu et al. | 322/19 |
| 4,733,156 | 3/1988 | Tanaka et al. | 322/20 |
| 4,855,664 | 8/1989 | Lane | 322/19 |
| 5,206,580 | 4/1993 | Okamoto et al. | 322/46 |
| 5,300,876 | 4/1994 | Takagi | 322/58 |
| 5,302,906 | 4/1996 | Lerch | 324/650 |
| 5,483,147 | 1/1996 | Ilic et al. | 322/25 |

OTHER PUBLICATIONS

Y. Cao et al., "A Nonlinear Variable Structure Stabilizer For Power System Stability", 94 WM 126–3 EC, IEEE/PES 1994 Winter Meeting, N.Y., N.Y. Jan. 30–Feb. 3, 1994, pp. 1–7.

*Primary Examiner*—Steven L. Stephan
*Assistant Examiner*—Nicholas Ponomarenko
*Attorney, Agent, or Firm*—Rothwell, Figg, Ernst & Kurz

[57] ABSTRACT

The stabilizer for power system is capable of suppressing power unstableness quickly and functioning effectively to a plurality of power disturbances even if the non-linearity of the power system becomes more intense because the stability point is moved from optimum stability. A phase difference calculating circuit calculates the phase difference between the internal phase angle of a generator and the voltage phase in a secondary bus line of a main transformer connected to a synchronous generator. A power system stabilizer produces an auxiliary signal based on the output of the phase difference calculating circuit. A first nonlinear compensating circuit and a second nonlinear compensating circuit produce compensating signals for compensating the non-linearity of the power system in order to compensate the output of the power system stabilizer.

6 Claims, 6 Drawing Sheets

STABILIZER FOR POWER SYSTEM

BACKGROUND OF THE INVENTION

1. Field of the Invention

The present invention relates to a stabilizer for power system which is applied to an exciter of a synchronous generator.

2. Description of the Prior Art

Figure 1:
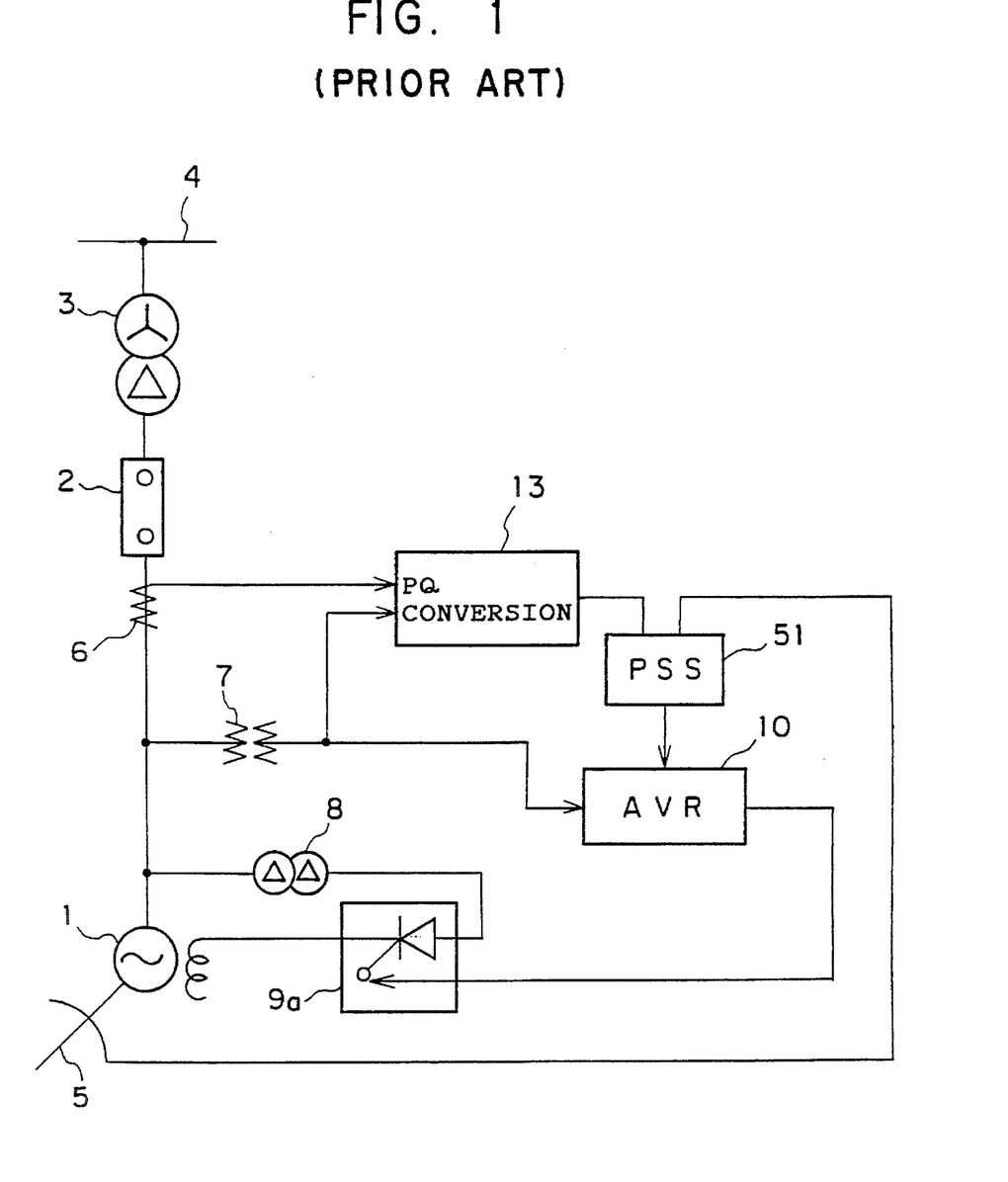
FIG. 1 is a system construction diagram showing the construction of a typical stabilizer for power system.

FIG. 1 is a system configuration diagram showing the construction of a typical stabilizer for power system. Referring to the same Figure, reference numeral 1 designates a synchronous generator (hereinafter referred to as generator), numeral 2 designates a circuit breaker for tripping the generator 1 from an external power system 4, numeral 3 designates a main transformer disposed between the circuit breaker 2 and the external power system 4, numeral 5 designates a turbine shaft connected to the rotor of the generator 1, numeral 6 designates a transformer for detecting current from the generator 1, numeral 7 designates a transformer for detecting the terminal voltage of the generator 1, numeral 13 designates a converter for calculating output from the generator according to voltage and current detected by means of the transformers 6, 7, numeral 51 designates a power system stabilizer for generating auxiliary signals for automatic voltage regulator (AVR) by inputting the rotation speed of the rotor and the power generated in the generator 1, numeral 10 designates automatic voltage regulator (AVR) for stabilizing the terminal voltage in the generator 1, numeral 8 designates a transformer for supplying part of electric power generated in the generator 1 to a thyrister exciter 9a which excites the field winding of the generator 1.

When the terminal voltage of the generator 1 detected by the transformer 7 deviates from the reference value, the AVR 10 controls the thyrister exciter 9a so as to make the deviation from the reference value zero. The power system stabilizer 51 receives the output of the generator through the converter 13 and the rotation speed of the rotor. To improve the stability of the power system, the power system stabilizer 51 produces auxiliary signals from the output of the generator and the rotation speed of the rotor and supplies auxiliary signals to the AVR. The AVR 10 controls the thyrister exciter 9a according to the voltage deviation reflected by the auxiliary signals Generally, the power system stabilizer 51 uses one of the deviation of the generator output, the deviation of the rotation speed of the generator and the deviation of system frequency. The deviation mentioned here refers to difference to each reference value.

Figure 2:
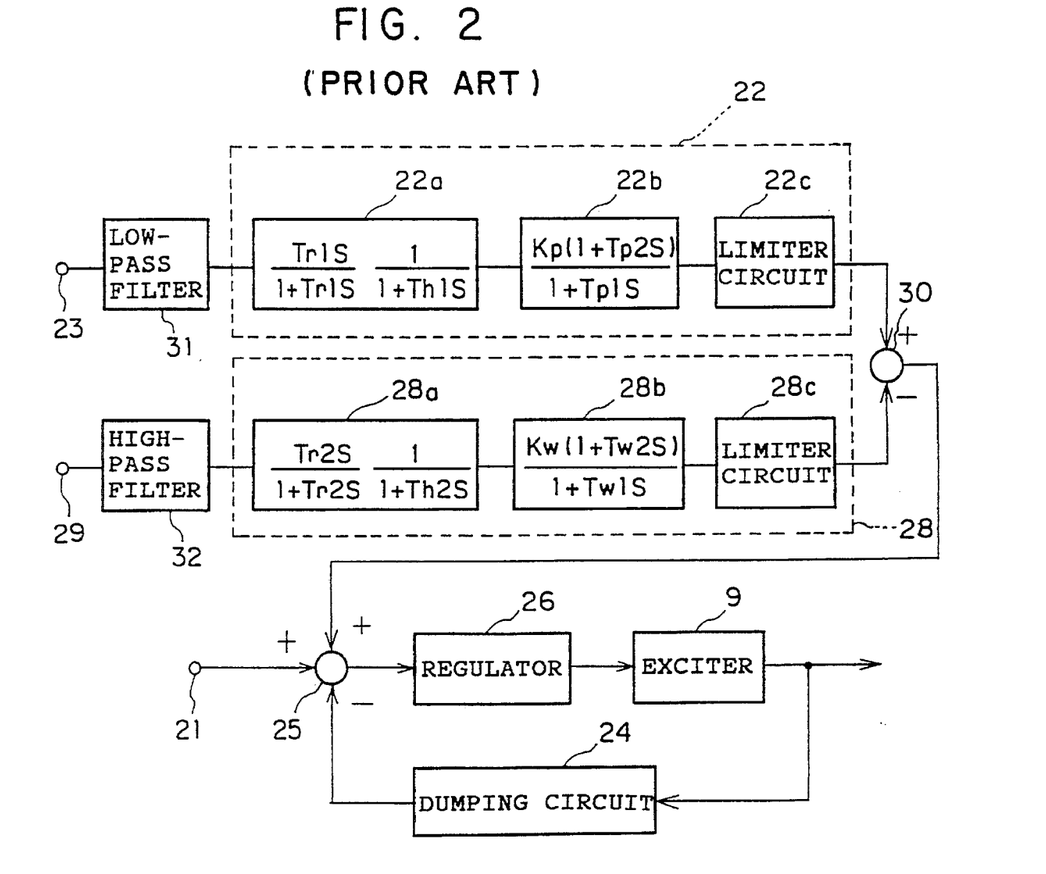
FIG. 2 is a block diagram showing a section containing the power system stabilizer and the excitation system in the conventional stabilizer for power system.

FIG. 2 is a block diagram showing a section containing the power system stabilizer and the excitation system (including the AVR and the exciter) in the conventional stabilizer for power system disclosed in, for example, Japanese Patent Publication No. 4-35975. The components shown in FIG. 2 constitute a two-parallel-type power system stabilizer (two-parallel-type PSS). Referring to the same Figure, numeral 31 designates a low-pass filter which receives the deviation signal of the rotation speed of the rotor of the generator 1 from an input terminal 23 and passes through only components below a predetermined frequency of the input signal. Numeral 22 designates a first power system stabilizer for producing an auxiliary signal relating to the deviation of the rotation speed according to the output of the low-pass filter 31. In the first power system stabilizer 22, numeral 22a designates a filter circuit for determining the reacting range of the input signal and usually has the transfer characteristic in the form of $[Tr1.S/(1+Tr1.S)] \cdot [1/(1+Th1.S)]$. Numeral 22b designates an amplifying/phase correcting circuit for compensating time lag of a regulator 26, an exciter 9, the generator 1 and the like, and usually has the transfer characteristic in the form of $Kp \cdot (1+TP2.S)/(1+TP1.S)$. Numeral 22c designates a limiter circuit for limiting the output of the first power system stabilizer 22 so that it is on appropriate signal level from the viewpoint of the overall excitation system.

Reference numeral 32 designates a high-pass filter receiving the output deviation signal from the input terminal 29 and passing through only components above a predetermined frequency of the input signal. Numeral 28 designates a second power system stabilizer for producing an auxiliary signal relating to the output deviation according to the output of the high-pass filter 32. In the second power system stabilizer 28, numeral 28a designates a filter circuit for determining the reacting range of the input signal and has the transfer characteristic in the form of $[Tr2.S/(1+Tr2.S)] \cdot [1/(1+Th2.S)]$. Numeral 28b designates an amplifying/phase correcting circuit and has the transfer characteristic in the form of $Kw \cdot (1+Tw2S)/(1+Tw1S)$. Numeral 28c designates a limiter circuit for limiting the output of the second power system stabilizer 28 so that it is on appropriate signal level from the viewpoint of the overall excitation system. Numeral 30 designates a subtractor circuit for subtracting the output of the second power system stabilizer 28 from the output of the first power system stabilizer 22.

Reference numeral 21 designates an input terminal to which a deviation from the reference value of the terminal voltage of the generator 1 is input. Numeral 25 designates an operation circuit for adding the voltage deviation from the input terminal 1 to the output of the subtractor circuit 30 and simultaneously subtracts the output of the dumping circuit 24 from the sum. Numeral 26 designates a regulator for controlling the exciter 9 according to the output of the operation circuit 25. Numeral 9 designates an exciter for exciting the field winding of the generator 1. Numeral 24 designates a dumping circuit for achieving feed-back of the output of the exciter 9 toward the input side of the regulator 26 in order to stabilize voltage control.

The filters 31, 32, the first power system stabilizer 22, the second power system stabilizer 28 and the subtractor circuit 30 correspond to the power system stabilizer 51. The operation circuit 25, the regulator 26 and the dumping circuit 24 correspond to the AVR. The exciter 9 corresponds to the thyrister exciter 9a.

Next, the operation of the stabilizer for power system will be described below. The power system stabilizer 51 generally uses one of the deviation of the generator output, the deviation of the rotation speed of the generator and the deviation of the system frequency. Herein the case in which the deviation of the rotation speed of the generator is input into the power system stabilizer 22 will be explained. When a rotation speed deviation signal is input to the input terminal 23, the low-pass filter 31 cuts off frequency components of over 5–10 rad/sec in order to remove influences of noise and twisting vibration from the signal. Further, the rotation speed deviation signal inputs to the amplifying/phase correcting circuit 22b after the dc component and high frequency component are eliminated by the filter circuit 22a. The amplifying/phase correcting circuit 22b amplifies the signal and corrects the phase thereof appropriately. The amplifying/phase correcting circuit 22b is set so as to perform phase lead correction. Then, the limiter circuit 22c limits the output of the amplifying/phase correcting circuit 22b so as to be below appropriate signal level from the viewpoint of the overall excitation system.

When a deviation occurs in the rotation speed of the generator, the output of the generator is also changed. Thus, an output deviation signal is input to the input terminal 29. The high-pass filter 32 eliminates frequency component of below 1-2 rad/sec in order to secure sufficient effect against frequency variation in such a range in which the first power system stabilizer 22 does not act effectively. The output deviation signal inputs to the amplifying/phase correcting circuit 28b after dc component and high frequency component are eliminated by the filter circuit 28a. The amplifying/phase correcting circuit 28b is set so as to perform phase lag correction. The limiter circuit 28c limits the output of the amplifying/phase correcting circuit 28b so as to be below appropriate signal level from the viewpoint of the overall excitation system.

The subtractor circuit 30 subtracts the output of the second power system stabilizer 28 from the output of the first power system stabilizer 22 and then outputs the result to the operation circuit 25. The operation circuit 25 adds the output of the subtractor circuit 30 to the deviation of the terminal voltage of the generator 1, the deviation being input through the input terminal 21. Then, the operation circuit 25 subtracts the output of the dumping circuit 24 and supplies the result to the regulator 26.

The aforementioned action of the two-parallel-type power system stabilizer take measures effectively to system unstableness which includes 1) vibration in low frequency system having a cycle of 3-5 sec, and 2) vibration in the generator having a cycle of about 1 sec. That is, the first power system stabilizer 22 to which a rotation speed deviation is input, having a characteristic for phase lead generates an auxiliary signal against low frequency vibration between power systems. The second power system stabilizer 28 to which a generator output deviation is input, having a characteristic for phase lag generates an auxiliary signal against output vibration between generators, having a cycle of about 1 sec. Then, these auxiliary signals are added to the excitation system so as to raise dumping performance in a plurality of electric power unstable modes.

The conventional stabilizer for power system is constructed in the aforementioned configuration. Thus, it functions effectively to a plurality of power unstable modes which can be preliminarily expected. However, if the number of the electric power unstable modes to be taken measures to is increased, it is necessary to increase the number of the power system stabilizers correspondingly.

Constants for use in the amplifying/phase correcting circuits 22b, 28b are design values corresponding to the relation between the output P of the generator 1 and the internal phase angle 6, the relation being linearized in the vicinity of a certain stable point. Thus, the power system stabilizer 51 operates effectively against little vibration in the vicinity of the design point (e.g., δ1 in FIG. 3). However, the conventional apparatus has such a problem that the stability of the power system cannot be secured when non-linearity becomes more intense (e.g., when the stability point is moved to δ2 in FIG. 3) caused by movement of the stability point is moved due to a change of the power system construction or a large scale load trip.

SUMMARY OF THE INVENTION

Accordingly, an object of the present invention is to solve the aforementioned problem and provide a stabilizer for power system which is capable of suppressing power unstableness quickly and exerting sufficient stabilizing effect against a plurality of electric power unstable modes even in such a condition in which the non-linearity of the power system becomes more intense.

According to the first aspect of the present invention, there is provided a stabilizer for power system which supplies an auxiliary signal based on the deviation of generator output, the deviation of the rotation speed of the generator or the deviation of the system frequency to an automatic voltage regulator which adjusts the excitation amount of the generator in order to stabilize the power system, said stabilizer including a phase difference calculating circuit for calculating the phase difference of an internal phase angle of a generator from the voltage phase in the secondary bus line of a main transformer connected to the generator and for outputting a deviation of the phase difference from a phase difference reference value, and further including a power system stabilizer for producing an auxiliary signal based on the output of the phase difference calculating circuit. The "internal phase angle" of the generator is also known as the "rotor displacement angle" or the "load angle". The power system stabilizer is capable of suppressing power unstableness quickly by directly controlling the internal phase of the unstable generator using a deviation calculated by the phase difference calculating circuit.

According to the second aspect of the present invention, there is provided a stabilizer for power system further including a first nonlinear compensating circuit for outputting a compensating signal for compensating the non-linearity of power system according to the deviation calculated by the phase difference calculating circuit, the deviation of the rotation speed of the generator, the internal voltage of the synchronous generator and the secondary voltage of the main transformer.

According to the third aspect of the present invention, there is provided a stabilizer for power system still further including a second nonlinear compensating circuit for outputting a compensating signal for compensating the non-linearity of the power system according to the phase difference calculated by the phase difference calculating circuit and the secondary voltage of the main transformer.

The first nonlinear compensating circuit and the second nonlinear compensating circuit of the present invention operate so as to weaken the non-linearity of the power system, thereby allowing the response of the automatic voltage control system to be linearized and compensate the output of the power system stabilizer as if a fixed constant in a conventional power system stabilizer is replaced with an optimum value.

DETAILED DESCRIPTION OF THE PREFERRED EMBODIMENTS

Figure 4:
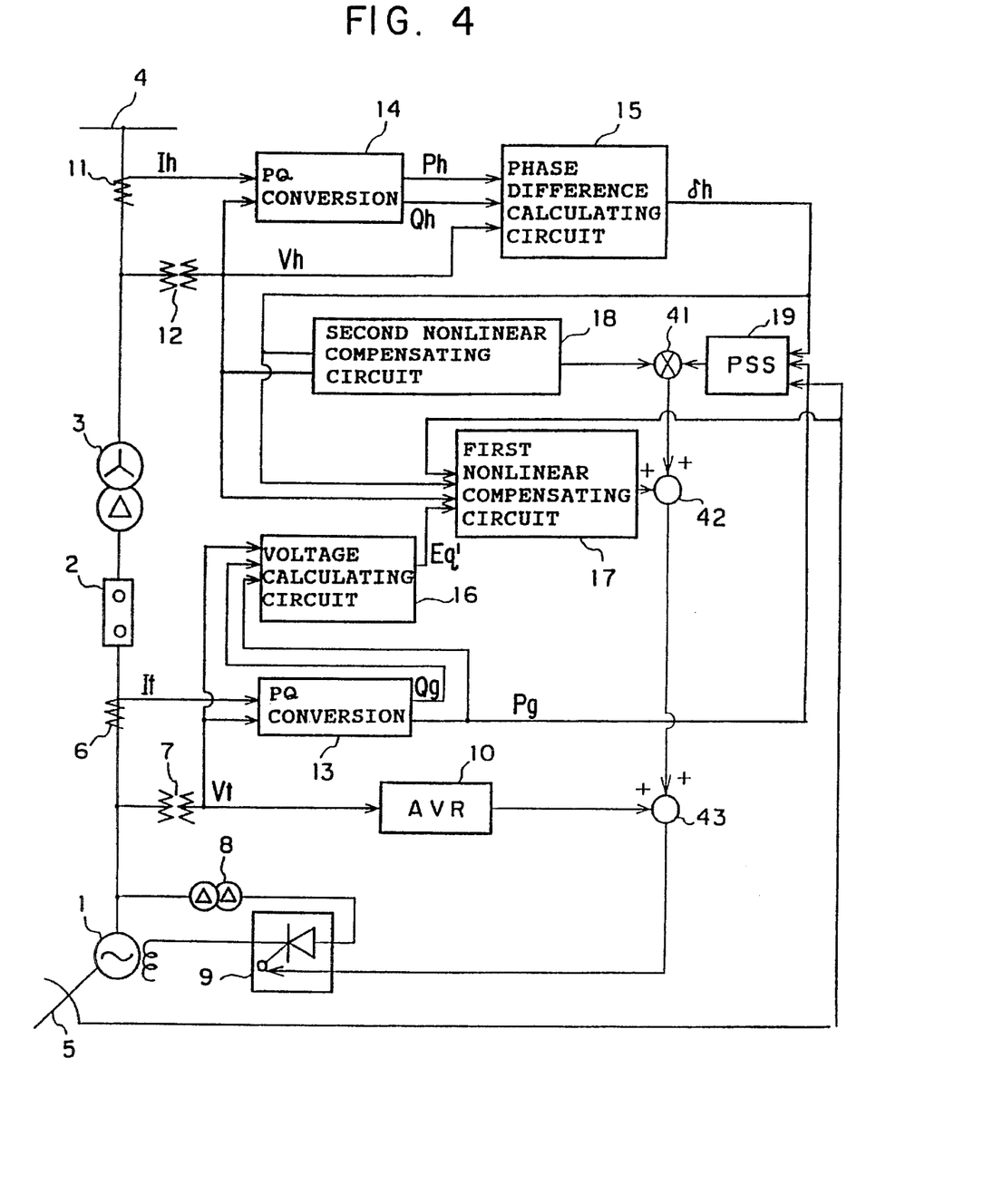
FIG. 4 is a system construction diagram of a system including a power system stabilizer which is an embodiment of the present invention.

Hereinafter an embodiment of the present invention will be described. FIG. 4 is a system construction diagram of a system including a stabilizer for power system according to an embodiment of the present invention. Referring to the same diagram, reference numeral 11 designates a transformer for detecting current $I_h$ in the secondary bus line of a main transformer 3, numeral 12 designates a transformer for detecting voltage $V_h$ in the secondary bus line of the main transformer 3, numeral 14 designates a converter for calculating electric power according to the detected current and voltage, numeral 15 designates a phase difference calculating circuit for obtaining a phase difference δh between the voltage phase of the main transformer 3 and the internal phase angle of the generator 1 by using the output $P_h$, $Q_h$ of the converter 14, the detected voltage by the transformer 12 and the like, numeral 16 designates a voltage calculating circuit for obtaining the internal voltage of the generator 1 by using the output of the converter 13, the terminal voltage of the generator 1 and the like, numeral 17 designates a first nonlinear compensating circuit for producing a compensating signal for weakening the non-linearity of the power system by using the output of the phase difference calculating circuit 15, the output $E_q$, of the voltage calculating circuit 16, the detected voltage by the transformer 12 and a deviation of the rotation speed of the generator 1, numeral 18 designates a second nonlinear compensating circuit for producing a compensating signal for weakening the non-linearity of the power system by using the output of the phase difference calculating circuit 15 and a detected voltage by the transformer 12, and numeral 19 designates a power system stabilizer for producing an auxiliary signal for the AVR 10 by using the deviation of the rotation speed of the generator 1, the deviation of the terminal voltage of the generator 1 and the output of the phase difference calculating circuit 15.

Reference numeral 41 designates a multiplier for multiplying the output of the power system stabilizer 19 by the output of the second nonlinear compensating circuit 18, numeral 42 designates an adder for adding the output of the first nonlinear compensating circuit 17 to the output of the multiplier 41, and numeral 43 designates an adder for adding the output of the adder 42 to the excitation system. The other components are given the same numerals as in FIG. 1.

Figure 5:
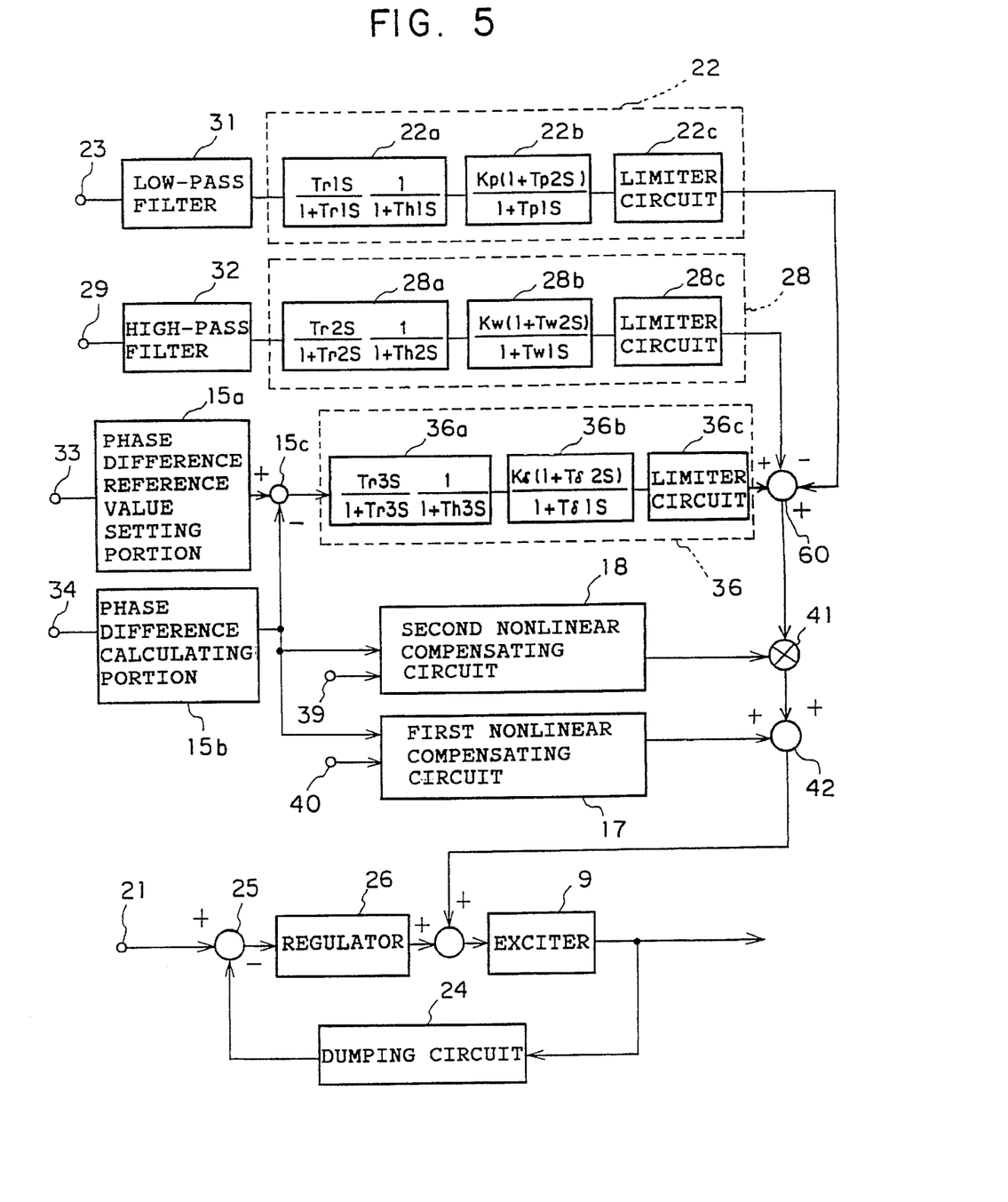
FIG. 5 is a block diagram showing the construction of a phase difference calculating circuit, a first nonlinear compensating circuit, a second nonlinear compensating circuit and a power system stabilizer together with an excitation system.

FIG. 5 is a block diagram showing the construction of the phase difference calculating circuit 15, the first nonlinear compensating circuit 17, the second nonlinear compensating circuit 18 and respective power system stabilizers along with the excitation system. Referring to the same diagram, numeral 15a designates a phase difference reference value setting portion for setting a reference value δh0 of phase difference, numeral 15b designates a phase difference calculating portion for calculating the phase difference δh of the internal phase angle of the generator 1 from the voltage phase in the secondary bus line of the main transformer 3, numeral 15c designates a subtractor for obtaining a deviation between the phase difference δ by the phase difference calculating portion 15b and the reference value δh0, numeral 36 designates a third power system stabilizer for producing an auxiliary signal relating to phase difference and numeral 60 designates an operating circuit which subtracts the output of the second power system stabilizer 28 from the output of the first power system stabilizer 22 and adds the output of the third power system stabilizer 36 thereto. The other components are given the same numerals as in FIG. 2 or 4.

In the third power system stabilizer 36, numeral 36a designates a filter circuit for determining the reacting range of the input signal, having the transfer characteristic in the form of [Tr3.S/(1+Tr3.S)].[1/(1+Th3.S)]. Numeral 36b designates an amplifying/phase correcting circuit, having the transfer characteristic in the form of Kδ.(1+Tδ2.S)/(1+Tδ1.S). Numeral 36c designates a limiter circuit for limiting the output of the third power system stabilizer 36 so as to be on appropriate signal level from the viewpoint of the overall excitation system.

The phase difference reference value setting portion 15a, the phase difference calculating portion 15b and the subtractor 15c correspond to the phase difference calculating circuit 15 shown in FIG. 4. The filter circuits 31, 32, the first power system stabilizer 32, the second power system stabilizer 28 and the third power system stabilizer 36 correspond to the power system stabilizer 19 shown in FIG. 1.

Figure 6:
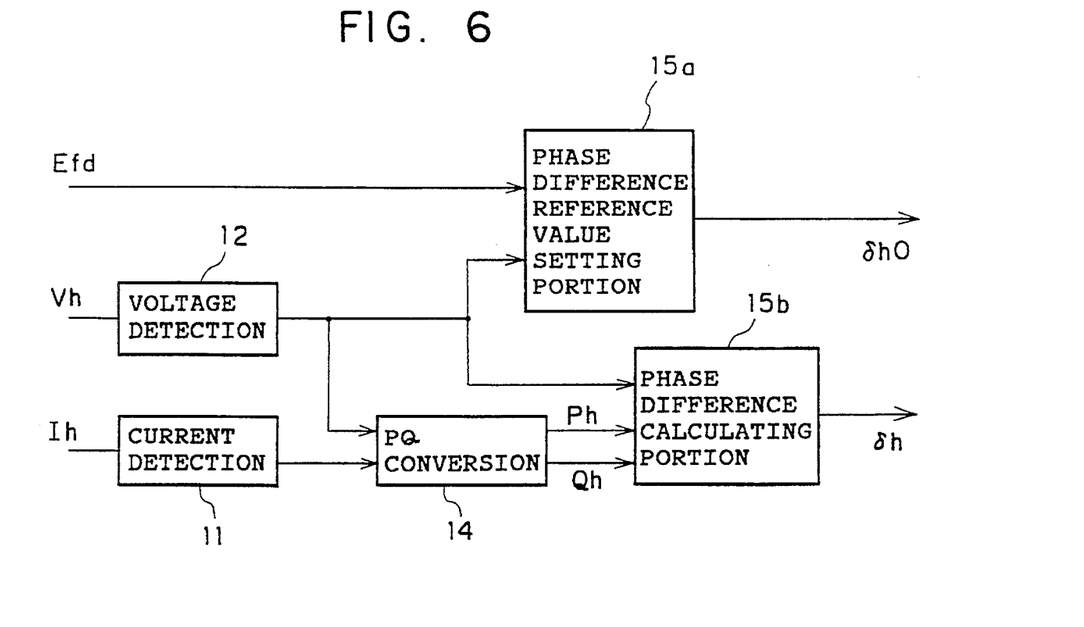
FIG. 6 is a block diagram showing the phase difference calculating circuit together with the input portion.

Next, the operation of stabilizer for power system of the present invention will be described herein. As shown in FIG. 6, the voltage Vh of the main transformer 3 is detected by the transformer 12 and the passing current Ih is detected by the transformer 11. The converter 14 calculates the passing tidal currents Ph, Qh of the main transformer 3 according to the detected voltage Vh and current Ih. The phase difference calculating portion 15b obtains the internal phase angle or the phase difference δh with reference to the phase of the secondary bus line voltage Vh of the main transformer 3 by using the detected voltage Vh, the passing power flow Ph, Qh, reactance Xt of the main transformer 3 and synchronous reactance Xq of the generator 1.

Because the phase difference δh is a phase difference between the voltage phase in the higher voltage bus line (secondary bus line of the main transformer) and the internal voltage phase in the generator, it can be obtained according to:

$$\delta h = \tan^{-1}[(Ph.(Xt+Xq)-Qh.Ra)/(Ph.Ra+Qh.(Xt+Xq)+Vh^2)].$$

Because Ra is as small as can be omitted as compared with Xq, the phase difference calculating portion 15b calculates the phase difference δh according to:

$$\delta h = \tan^{-1}[Ph.(Xt+Xq)/(Qh.(Xt+Xq)+Vh^2)]$$

On the other hand, the phase difference reference value setting portion 15a receives the field voltage Efd of the generator 1 in at terminal 33 order to determine appropriate phase reference value δh0 to the hourly changing situation of the power system. That is, it calculates a phase corresponding to the output of the generator by using the field voltage Efd of the generator 1 and the internal voltage Eq' of the generator and then that calculated value is assumed to be δhO according to:

$$\cos(\delta h0) = ((1+b) \cdot Eq' - Efd)/b \cdot Vh$$

In this expression, $b=(Xd-Xd')/(Xt+Xd')$. Xd is the direct-axis reactance of the generator 1. Xd' is direct-axis transient reactance. The internal voltage Eq' of the generator may be introduced from, for example, the voltage calculating circuit 16 mentioned later.

Although the internal phase angle of the generator 1 cannot be directly measured, it is possible to obtain a substitute (difference δh between the phase of Vh and the internal phase angle of the generator 1) thereof in the aforementioned manner. Namely, the phase difference δh includes the internal phase angle of the generator 1 as information. Power unstableness is referable to the unstableness of the internal phase angle of the generator 1. Suppressing this unstableness enables to stabilize the system. If the amount of the power flow passing though the main transformer 3 is changed due to modification of the power system construction or the like, the phase comes into unstable status since the deviation between the phase in the secondary bus line of the main transformer 3 and the internal phase of the generator varies. Consequently, the phase difference δh calculated by the phase difference calculating portion 15b deflects from the phase reference value δh0.

The subtractor 15c detects the deflection and supplies its corresponding deviation signal to the third power system stabilizer 36. In the third power system stabilizer 36, the filter circuit 36a removes noise and the like in high-frequency range of the deviation signal. The amplifying/phase correcting circuit 36b corrects the phase in order to compensate time lag in the regulator 26, the exciter 9, the generator 1 and the like and simultaneously amplifies signal. The limiter circuit 36c limits signal level to prevent the level of the signal to be supplied to the excitation system from being excessively increased.

The output of the limiter circuit 36c is added to the output of the two-parallel-type power system stabilizer, that is, the outputs of the first power system stabilizer 22 and the second power system stabilizer 28, by the operation circuit 60. The output of the operation circuit 60 is supplied to the excitation system as the output of the stabilizer for power system. In the excitation system, the auxiliary signal is added to the output of the exciter 9 and then supplied to the field winding. Thus, the deviation of the internal phase angle of the generator from the reference value is controlled so as to be zero.

By directly controlling the internal phase angle of 20 the generator being unstable, the unstableness of electric power is suppressed quickly.

Although a single amplifying/phase correcting circuit 36b is provided in the present embodiment, it is permissible to provide two or more amplifying/phase correcting circuits. Additionally, the power system stabilizer may be constructed of analog circuit or digital circuit.

EMBODIMENT 2

By compensating the outputs of the first, second, third power system stabilizers 22, 28, 36 by the output of the first nonlinear compensating circuit 17 as shown in FIG. 4, it is possible to make a response of the automatic voltage control system linear regardless of the operating condition of the generator 1.

Figure 7:
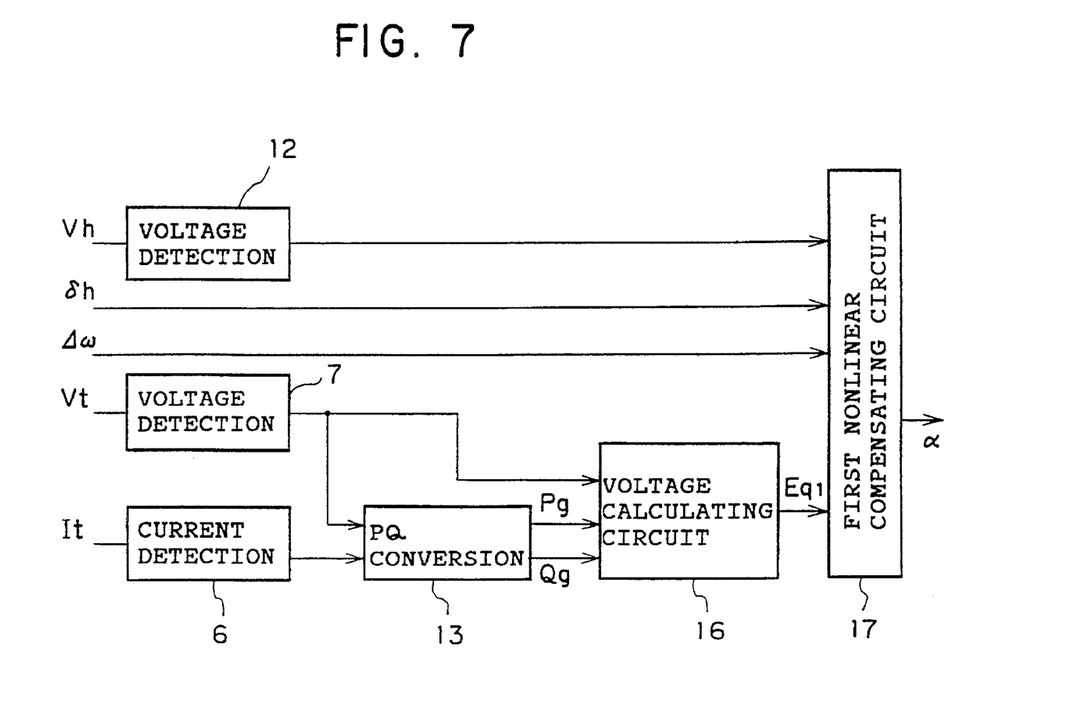
FIG. 7 is a block diagram showing the first nonlinear compensating circuit together with the input portion.

As shown in FIG. 7, the converter 13 calculates the power flow Pg, Qg at the terminal of the generator 1 according to the terminal voltage Vt at the generator 1 detected by the transformer 7 and the current It detected by the transformer 6. The internal voltage calculating circuit 16 calculates the internal voltage Eq' of the generator 1 according to the power flow Pg, Qg. The first nonlinear compensating circuit 17 introduces the secondary bus line voltage Vh of the main transformer 3, the internal voltage Eq' and the phase difference δh and the rotation speed deviation Δω of the generator 1.

Figure 3:
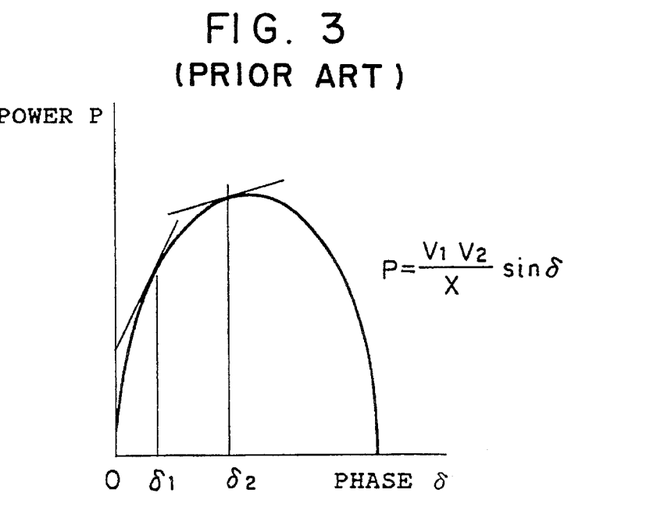
FIG. 3 is an explanatory diagram showing the relation between the output of the generator and the internal phase angle of the generator.

If the stable point is moved because of a change of the power system construction or large scale load trip as shown in FIG. 3, intense non-linearity appears between the output P of the generator 1 and the internal phase angle δ of the generator 1. That is, as shown in FIG. 3, the output P is expressed by $P=(V1 \cdot V2/X) \sin \delta$, so that the entry of sine function produces intense non-linearity. Where V1, V2 are the voltage of each node, X is the reactance between respective nodes, and δ is a phase angle between V1 and V2.

The first nonlinear compensating circuit 17 calculates a formula in order to enable the automatic voltage control system to achieve linear response. The formula makes the sine function with respect to the relation between output P and the internal phase angle δ to be linear within a predetermined range by operation for converting coordinate axes. And the first nonlinear compensating circuit 17 outputs such a compensating signal for compensating between an originally nonlinear portion and a portion to be linearized. The outputs of the first, second, third power system stabilizers 22, 28, 36 are added to the compensating signal by the adder 42 and the output of the adder 42 is supplied to the excitation system. The above-mentioned formula is shown below for example.

$$Td0 \cdot (\omega - \omega)/(d + \sin \delta h)[f \cdot \cos(2\delta h) - d \cdot Eq' \cdot \cos \delta h] + (1+b) \cdot Eq' - b \cdot Vh \cdot \cos \delta h$$

Where M is the inertia constant of the generator 1, Td0 is the time constant of the field circuit in the generator 1, X1 is the sum of the reactance of the main transformer 3 and the synchronous reactance of the generator 1, and ω0 is the synchronous rotation speed of the generator 1. Additionally, $d=[1/(Xt+Xq)] \cdot (1+b) \cdot Vh$, $f=[1/(Xt+Xq)] \cdot b \cdot Vh^2$ are established.

As described above, if the stable point of the generator 1 is moved, it is possible to use the outputs of the first, second, third power system stabilizers 22, 28, 36 effectively.

EMBODIMENT 3

Figure 8:
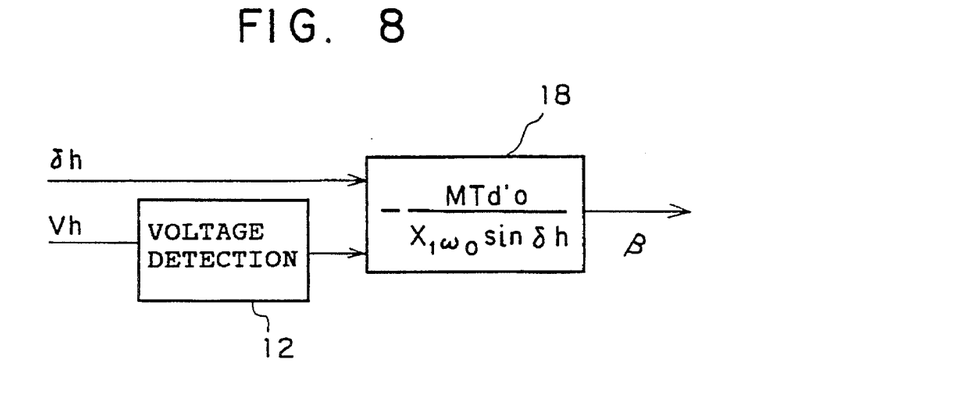
FIG. 8 is a block diagram showing the second nonlinear compensating circuit together with the input portion.

As shown in FIG. 4, it is permissible to compensate the outputs of the first, second, third power system stabilizers 22, 28, 36 by means of the output of the second nonlinear compensating circuit 18. As shown in FIG. 8, the second nonlinear compensating circuit 18 introduces the phase difference δh and the secondary bus line voltage Vh of the main transformer 3 in order to perform operation according to, for example, $-(M \cdot Td0)/(X1 \cdot \omega 0 \cdot \sin \delta h)$.

That is, the second nonlinear compensating circuit 18 generates and outputs a compensating signal so as to weaken the non-linearity of the power system and to enable the automatic voltage control system to achieve linear response by using respective constants, the phase difference δh and the secondary bus line voltage Vh of the main transformer 3. The second nonlinear compensating circuit 18 performs a kind of conversion of control input. Although the first nonlinear compensating circuit 17 performs operation for linearizing the nonlinear system by means of coordinate conversion, this circuit 18 calculates an auxiliary signal for matching the linear responded control signal so as to be an input of the original nonlinear system. Namely, this circuit operates to correct the responded signal on linear coordinate system, so that the corrected signal is utilized as an input signal on the original coordinate system. The output of the second nonlinear compensating circuit 18 is multiplied by the outputs of the first, second, third power system stabilizers 22, 28, 36 by the multiplier 41 and the output of the multiplier 41 is provided for the adder 42.

Figure 9:
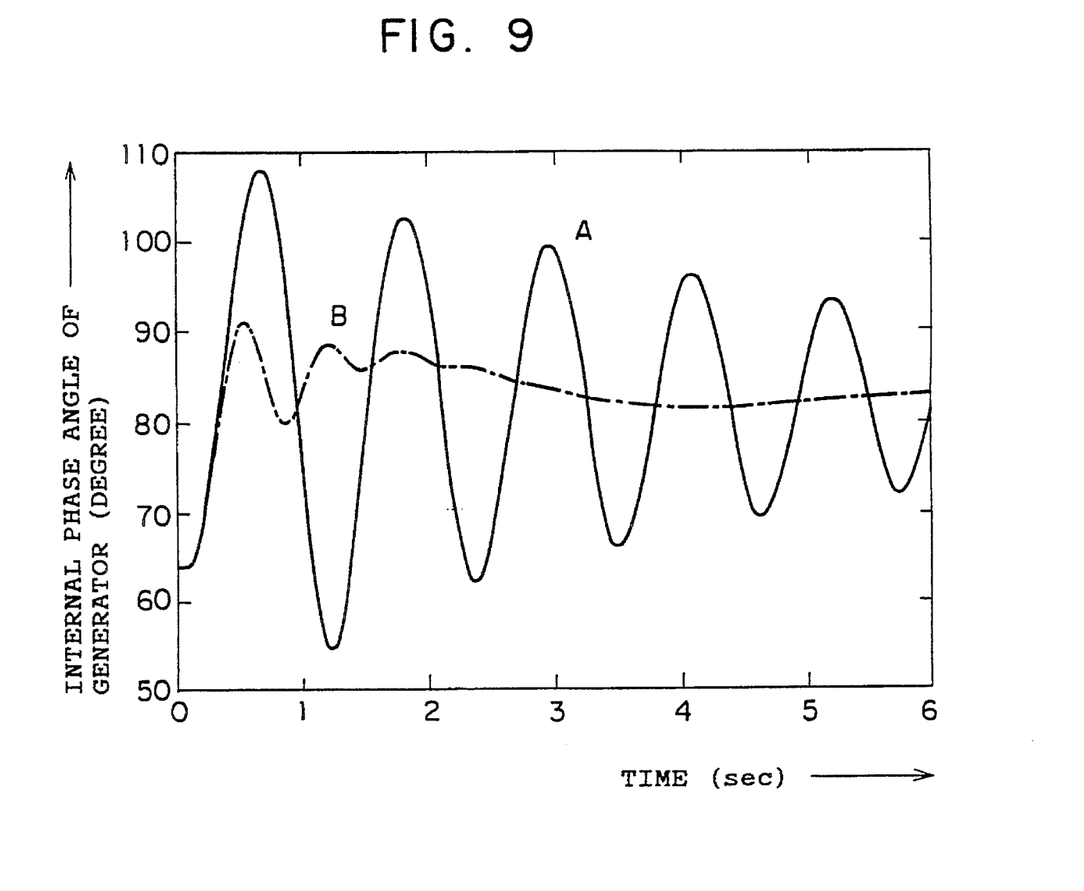
FIG. 9 is an explanatory diagram showing an example of comparison between power unstableness in the conventional stabilizer and power unstableness in the stabilizer for power system which is a third embodiment of the present invention.

As described above, when the stable point of the generator 1 is moved, it is possible to use the outputs of the first, second, third power system stabilizers 22, 28, 36 effectively. FIG. 9 is an explanatory diagram about the effect of this stabilizer for power system. In this diagram, the real line A indicates an example of power unstableness corresponding to a conventional two-parallel-type power system stabilizing and the real line B indicates the condition of power unstableness corresponding to the present stabilizer for power system under the same condition.

As described above, the stabilizer for power system calculates a phase difference of the internal phase angle of the generator relative to the voltage phase in the secondary bus line of the main transformer, outputs a phase deviation based on the phase difference reference value and produces an auxiliary signal according to the output of the phase difference calculating circuit. Thus, it is possible to directly control the internal phase of the generator being deflected, so that the power unstableness can be suppressed quickly.

When the stabilizer for power system is constructed so as to output a compensating signal for compensating the non-linearity of the power system by using the phase difference calculated by the phase difference calculating circuit, the deviation of the rotation speed of the synchronous generator, the internal voltage of the synchronous generator and the secondary voltage of the main transformer, it is possible to secure the stability of the power system even if the stable point is moved due to a change of the power system construction or large scale load trip.

Further, when the stabilizer for power system is constructed so as to output a compensating signal for compensating the non-linearity of the power system by using the deviation calculated by the phase difference calculating circuit and the secondary voltage of the main transformer, it is also possible to secure the stability of the power system even if the stable point is moved due to a change of the power system construction or a large scale load trip.

What is claimed is:

1. A stabilizer for stabilizing a synchronous generator of a power system, said stabilizer including an automatic voltage regulator for adjusting the excitation level of the synchronous generator in said power system with an auxiliary signal based on the deviation of generator output, the deviation of the rotation speed of the generator or the deviation of the system frequency in order to stabilize the synchronous generator while operating in said power system, wherein said synchronous generator operates in said power system with an internal phase angle formed by an angular displacement caused by the load between the terminal voltage and the armature voltage generated by the component of flux produced by the field current, said stabilizer comprising a phase difference calculating circuit for calculating the phase difference between said internal phase angle of said synchronous generator and the voltage phase in the secondary bus line of a main transformer connected to said synchronous generator and for outputting a deviation of said phase difference from a phase difference reference value, and a power system stabilizer for producing an auxiliary signal based on the output of said phase difference calculating circuit.

2. A stabilizer for power system according to claim 1 including a first nonlinear compensating circuit for generating and outputting a compensating signal for compensating the non-linearity of the power system according to the deviation calculated by the phase difference calculating circuit, the deviation of the rotation speed of the synchronous generator, the internal voltage of said synchronous generator and the secondary voltage of the main transformer.

3. A stabilizer for power system according to claim 2 including a second nonlinear compensating circuit for generating and outputting a compensating signal for compensating the non-linearity of the power system according to the phase difference calculated by the phase difference calculating circuit and the secondary voltage of the main transformer.

4. A stabilizer for power system according to claim 3 including a multiplier for multiplying the output of the second nonlinear compensating circuit by the output of the power system stabilizer.

5. A stabilizer for power system according to claim 4 including an adder for adding the output of the multiplier to the output of the first nonlinear compensating circuit and supplying the result of the addition to an automatic voltage control apparatus.

6. A stabilizer for power system according to claim 5 including another power system stabilizer for producing an auxiliary signal relating to the deviation of the rotation speed of the synchronous generator and still another power system stabilizer for producing an auxiliary signal relating to the output deviation of said synchronous generator, wherein said stabilizer for power system outputs signals produced from said respective auxiliary signals to the automatic voltage control apparatus.

\* \* \* \* \*